Nov. 30, 1965

M. WAHLI ETAL 3,220,721

CLAMPING DEVICE

Filed March 29, 1962

2 Sheets-Sheet 1

INVENTORS:
M. Wahli and W. Stauffacher
BY Richards & Geier
ATTORNEYS

United States Patent Office 3,220,721
Patented Nov. 30, 1965

3,220,721
CLAMPING DEVICE
Marcel Wahli, Riedenhaldenstrasse 37, Zurich, Switzerland, and Werner Stauffacher, Monchaltdorf, Switzerland; said Stauffacher assignor to said Wahli
Filed Mar. 29, 1962, Ser. No. 183,662
Claims priority, application Switzerland, Mar. 29, 1961, 3,721/61
6 Claims. (Cl. 269—182)

The present invention relates to a clamping device and, more particularly, to a screw clamp having clamping jaws extending parallel with respect to each other.

Screw clamps are known to the art in which the two clamping jaws are adjusted and clamped, respectively, by means of two threaded spindles. One of the two threaded spindles, i.e. the inner spindle, is secured in an axial direction in one jaw while the outer spindle supports the outer end of the jaw during the clamping operation.

When such parallel screw clamps are adjusted, it may occur that the spindles become bent since one of the spindles will abut when rotating the other spindle, because both spindles cannot be actuated simultaneously. Besides, screw clamps generally display the disadvantage that adjustment is tedious, particularly where the size of the object to be clamped varies frequently.

The present invention now has for its primary object to provide a screw clamp which eliminates these disadvantages.

Additionally, it is an important object of the present invention to provide for clamping means facilitating the adjustment and clamping of a workpiece, respectively.

A further object of the present invention is to provide a clamping device having parallel jaws which is reliable in operation and permits speedy application to workpieces of differing size.

Another object of the present invention is the provision of an improved screw clamp provided with means permitting engagement with or disengagement from the threads of a plurality of spindles extending parallel with respect to each other.

Still another object of the present invention is the provision of a screw clamp provided with a pair of clamping jaws and including means permitting sliding movement of at least one of the clamping jaws along a pair of threaded spindles extending in parallel relation with each other, said means further permitting simultaneous coupling of the movable clamping jaw with both of the aforesaid spindles in order to thereby clamp a workpiece between said pair of clamping jaws by rotating said spindles.

Figure 1:
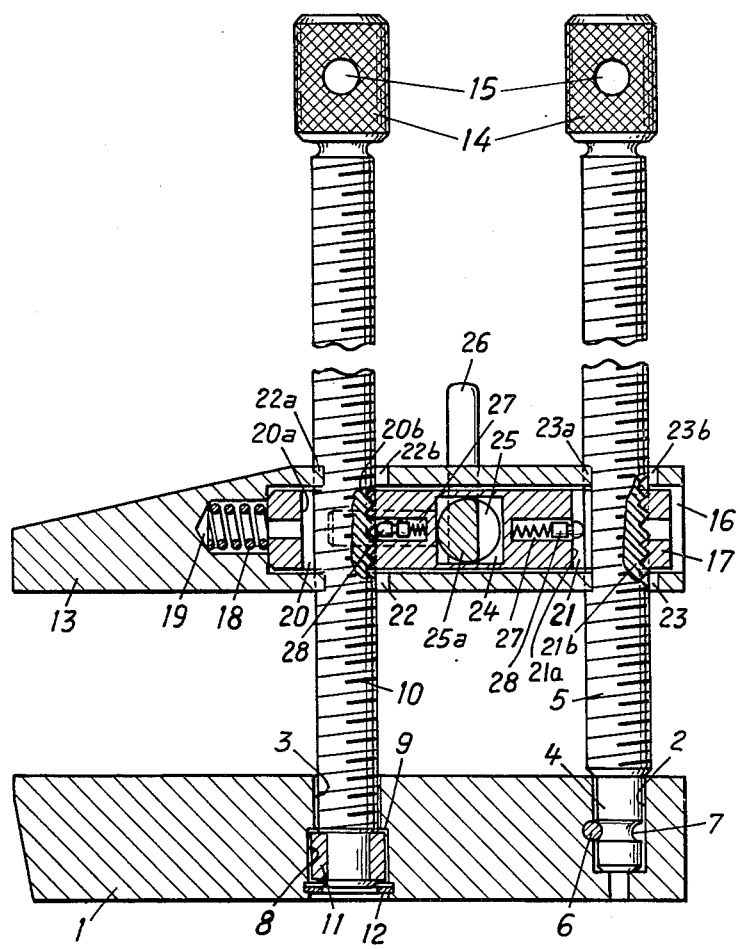
Figure 2:
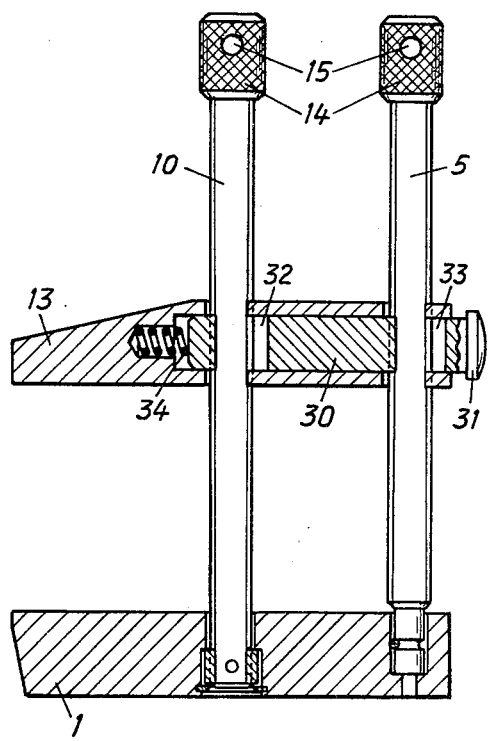

These and other objects of the present invention will become better apparent from the following description when taken in connection with the accompanying drawing in which:

FIG. 1 is a vertical cross-sectional view of a screw clamp constructed in accordance with a first embodiment of the invention, and FIG. 2 is a vertical cross-sectional view of a second embodiment.

Generally, it will be seen that the present invention provides for a fixed and a mobile or movable clamp jaw interconnected by two threaded spindles. The movable clamp jaw is provided with means having a disengageable thread portion for each such spindle, these thread portions being capable of being actuated jointly, and both spindles being secured against axial movement in the fixed clamp jaw.

Referring now more particularly to FIG. 1, reference numeral 1 designates a clamp jaw provided with two spaced parallel bores 2 and 3. Extending into the bore 2 is the cylindrical end 4 of a compression spindle 5 which is secured in this bore by a pin 6 which, in turn, is seated in the clamp jaw 1 so as to engage a circumferential groove 7 located at the aforesaid cylindrical end 4.

Extending into the bore 3 provided with a widened portion 8 forming a radial shoulder 9, is a threaded tension spindle 10, the end of which carries a rigidly attached sleeve 11. Under tension the sleeve 11 of spindle 10 bears against the shoulder 9. Inserted in the widened portion 8 is a locking spring ring 12 which prevents an axial displacement of the spindle 10, but permits ready removal for exchange or replacement of spindle 10.

The two threaded spindles 5 and 10 extend through an adjustable or movable clamp jaw 13 and each have their free end provided with a hand knob 14 provided with a respective transverse bore 15. The cylindrical outer surface of each hand knob 14 is knurled to facilitate gripping with the fingers.

In the longitudinal direction of the adjustably positionable clamp jaw 13 there extends a cylindrical bore 16 accommodating a displaceable spindle-thread engaging means, here in the form of a slide member 17. The slide member 17 is subjected to the action of a compression spring 18 which rests in the end of a reduced extension 19 provided at the bore 16. The slide member 17 is provided within the range of the threaded spindles 10 and 5 with two slots 20 and 21, respectively, which have their left-hand faces or sides provided with a cylindrical surface 20a and 21a, respectively, and their right-hand sides with a surface equipped with threaded grooves 20b, and 21b, respectively, the said grooves normally meshing with the threads of the spindles 5 and 10. Analogously, slots or bores 22 and 23 are provided at the movable clamp jaw 13 which have their left-hand sides 22a and 23a, respectively, provided with threaded grooves while their right-hand sides 22b and 23b, respectively, possess cylindrical surfaces. The diameter of the slots 23, 22 in their cylindrical portion is larger than the outside diameter of the threaded spindles 5 and 10.

Located in the slide 17 intermediate the two slots 20 and 21 and displaced by 90° relative to their axis is a square recess 24 through which extends a cog or cam segment 25a of a bolt 25 which has its two ends rotatably held in the clamp jaw 13 and which can be rotated by means of the operating arm 26 attached thereto. The cog or cam segment 25a forms an eccentric member with respect to the axis of rotation of the bolt 25 with which the slide 17 is caused to engage or bear under the action of the compression spring 18. In the position of the eccentric member 25a shown, the threaded grooves 20b and 21b of the slots 20 and 21, respectively, of the slide member 17 engage the complementary threads of the spindles 10 and 5, and the threads of these spindles are at the same time held in mesh or engagement with the threaded grooves 22a and 23a of the slots 22 and 23, respectively, provided at the movable clamp jaw 13. In this position of the slide member 17, the clamp jaw 13 can therefore be adjusted merely by rotating the spindle 5 and/or 10 as necessary, by way of example, for clamping a workpiece on a base or in clamping several workpieces together. However, if the movable clamp jaw 13 is desired to be displaced relative to the clamp jaw 1 by by a greater distance, this is effected not by rotating the spindles 5 and 10. By means of the arm 26 the bolt 25 may be rotated in such a manner that the flat portion of the cam segment or eccentric member 25a is rotated by 180°. The compression spring 18, which is biased, will thus displace the slide 17 until it engages the flat portion of the eccentric member. The threaded grooves 20b and 21b are thereby disengaged from the threads of the spindles 10 and 5 and, on the other hand, the clamp jaw 13 will be displaced relative to the threaded spindles so that the threaded grooves 22a and 23a are likewise disengaged from the spindles, the cylindrical surfaces 20a and 21a resting on the spindles. This enables the clamp jaw 13 to be axially displaced relative to the spindles 10 and 5 without necessitating rotation of said spindles. The cylindrical surfaces of the bores 20 and 22 and 21 and 23, respectively, cooperating with the respective spindle surface, ensure that the threads of the spindles 10 and 5 cannot engage the threaded grooves of these aforesaid bores.

If it is desired to engage the threads of the spindles with the threaded portions or grooves of the clamp at a predetermined point, the operating arm 26 must be rotated, a corresponding displacement of the slide 17 being thereby effected via the bolt 25. In order to prevent the threads of the spindles from engaging those of the slide 17 when the latter is moved, the slide 17 is, on the one hand, slightly smaller in diameter than the bore 16 provided in the clamp jaw 13. On the other hand, thread aligning means, in the form of spring-biased bolts 28 are incorporated in longitudinal recesses or bores 27 provided in the slide 17, the said alignment bolts tending to engage in the threads of the spindles 10 and 5 thus slightly displacing the slide 17 in the axial direction relative to the spindles if such proves necessary. This displacement ensures that the threads of the spindles 10 and 5 properly align and engage the threaded grooves 20b, 22a and 21b, 23a, respectively, and that damage to the thread section due to jamming of the slide is prevented. It will be seen from FIGURE 1 that the height of the slide member 17 is smaller than that of the associated bore 16, to thereby provide a degree of freedom of movement for said slide member such as to permit shifting or "floating" thereof axially of the threaded spindles 5, 10 during the aforesaid alignment operation.

The embodiment according to FIG. 2 differs from that according to FIG. 1 in that the slide 30 in the clamp jaw 13 is provided with a head 31 which projects beyond the end of this clamp jaw. On the other hand, the threaded grooves of the slide 30 and its slots 32 and 33 are so arranged in this embodiment that the compression spring 34 keeps them in engagement with the threads of the spindles 10 and 5. If it is desired to move the clamp jaw by a major distance, this may be performed by pressing the head 31 of the slide 30 against the action of the spring, the threads disengaging the threaded grooves and enabling the clamp jaw to be displaced in the axial direction of the spindle. Under the action of the spring 34, the threads will engage as soon as the head 31 is released and the spindles 10 and 5 slightly rotated. The threads of the spindles cannot be damaged while no engaging members corresponding to the bolts 28 in the embodiment according to FIG. 1 need be provided.

As this description reveals, the design disclosed of the parallel screw clamp enables the spacing of the clamp jaws to be rapidly adjusted and the wear of the threaded spindles to be avoided owing to the frequent rotation and, more specifically, the jamming or bending thereof to be eliminated.

A preferred embodiment uses threaded spindles with the same course of thread, but it is also possible to employ opposed threads.

Various modifications in the described clamping device may be made without departing from the spirit and scope of the invention.

Having thus described the nature of the present invention what is desired to be secured by United States Letters Patent is:

1. A clamping device comprising a pair of clamp jaws, one of said clamp jaws being movable relative to the other clamp jaw, threaded spindle means piercingly extending through said one movable clamp jaw and rotatably secured to said other clamp jaw, said one movable clamp jaw being provided with a bore extending transverse to said threaded spindle means, thread engaging means displaceably mounted in said transverse bore for engaging the threads of said threaded spindle means, said thread engaging means including threaded portions engageable with said threads of said threaded spindle means for locking said movable clamp jaw in selected position axially of said threaded spindle means, means cooperating with said thread engaging means for selectively engaging and disengaging said threaded portions thereof with said threads of said threaded spindle means, and alignment means for aligning the threads of said threaded spindle means with the threaded portions of said thread engaging means prior to engagement thereof.

2. A clamping device comprising a pair of clamp jaws, one of said clamp jaws being movable relative to the other clamp jaw, each of said clamp jaws being provided with a pair of spaced openings defined by walls, each of said openings of said one movable clamp jaw being in alignment with a cooperating opening of said other clamp jaw, a pair of threaded spindles piercingly extending through the respective openings of said one movable clamp jaw and rotatably secured in the cooperating aligned openings of said other clamp jaw, the walls of each of said openings of said one movable clamp jaw being provided with a smooth walled portion and a diametrically opposite situated threaded portion engageable with the threads of the associated spindle, said one movable clamp jaw being provided with a bore extending transverse to said pair of threaded spindles, a slide member displaceably supported within said transverse bore, said slide member being provided with a pair of bores through each of which one of said threaded spindles extends, each of said bores of said slide member including a smooth walled portion and a diametrically opposite threaded portion engageable with the threads of the associated threaded spindle for locking said movable clamp jaw in selected position axially of said pair of threaded spindles, the threaded portions of said respective bores of said slide member being disposed at substantially diametrically opposed relation with respect to the threaded portion of the associated openings of said movable clamp jaw, means cooperating with said slide member for selectively engaging and disengaging said threaded portions of said slide member with the threads of the associated threaded spindle, and alignment means for aligning the threads of the respective threaded spindle with the threaded portions of the associated bores of said slide member prior to engagement thereof.

3. A clamping device as defined in claim 2 wherein said alignment means comprises a spring-biased alignment bolt cooperating with each associated threaded spindle and engageable with the threads thereof.

4. A clamping device as defined in claim 3 wherein said slide member is provided with a pair of recesses, each said recess being disposed to open towards an associated threaded spindle and slidably retains one of said spring-biased alignment bolts.

5. A clamping device as defined in claim 4 wherein the height of said slide member is less than the height of said transverse bore to provide a degree of freedom of movement for said slide member to permit shifting thereof axially of said threaded spindles during alignment of the threads of the latter with the threaded portions of said slide member.

6. A clamping device as defined in claim 5 wherein said cooperating means includes a cam segment configured to urge said threaded portions of said slide member into engagement with said threads of the associated threaded spindle, operating means for said cam segment to rotate the latter for releasing threaded engagement of said slide member with said threaded spindles, and spring-means for displacing said slide member so as to disengage the threaded portions thereof from said threaded spindles.

References Cited by the Examiner
UNITED STATES PATENTS

| 169,027 | 10/1875 | Navmann | 269—182 |
| 266,887 | 10/1882 | Reno | 269—219 X |
| 305,989 | 9/1884 | Weiser | 269—181 X |
| 368,278 | 8/1887 | Cheney | 269—182 |

ROBERT C. RIORDON, *Primary Examiner.*

BROUGHTON G. DURHAM, *Examiner.*